US012633213B2

(12) United States Patent
Kijima

(10) Patent No.: US 12,633,213 B2
(45) Date of Patent: May 19, 2026

(54) DRIVING SUPPORT DEVICE THAT CONTROLS NOTIFICATION OF THE COLOR OF A TRAFFIC LIGHT BASED ON THE SIZE OF AN INTERSECTION

(71) Applicant: TOYOTA JIDOSHA KABUSHIKI KAISHA, Toyota (JP)

(72) Inventor: Yoshitaka Kijima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/891,962

(22) Filed: Sep. 20, 2024

(65) Prior Publication Data

US 2025/0140114 A1 May 1, 2025

(30) Foreign Application Priority Data

Oct. 25, 2023 (JP) ................................ 2023-183430

(51) Int. Cl.
*G08G 1/0967* (2006.01)
*G08G 1/09* (2006.01)

(52) U.S. Cl.
CPC .................................. *G08G 1/0967* (2013.01)

(58) Field of Classification Search
None
See application file for complete search history.

(56) References Cited

U.S. PATENT DOCUMENTS

| | | | |
|---|---|---|---|
| 9,835,468 B2 | 12/2017 | Yoshitomi et al. | |
| 10,017,178 B2 | 7/2018 | Morimoto et al. | |
| 10,132,642 B2 | 11/2018 | Yoshitomi et al. | |
| 10,679,077 B2 | 6/2020 | Kinoshita et al. | |
| 11,010,624 B2 | 5/2021 | Hayashi et al. | |
| 11,017,247 B2 | 5/2021 | Hayashi et al. | |
| 11,117,595 B2 | 9/2021 | Sasaki et al. | |
| 2012/0146811 A1* | 6/2012 | Chou | G08G 1/096783 340/905 |
| 2021/0247526 A1 | 8/2021 | Kijima | |
| 2023/0130322 A1 | 4/2023 | Kijima | |

FOREIGN PATENT DOCUMENTS

| | | |
|---|---|---|
| JP | 2009-003766 A | 1/2009 |
| JP | 2023-063940 A | 5/2023 |

* cited by examiner

*Primary Examiner* — John F Mortell
(74) *Attorney, Agent, or Firm* — Finnegan, Henderson, Farabow, Garrett and Dunner, LLP

(57) ABSTRACT

In the driving support device, when the light color of the traffic light at the intersection in front of the own vehicle is yellow, the output unit outputs information of a call attention for the driver of the own vehicle. The distance acquisition unit acquires a travelable distance of the own vehicle within a predetermined reference time. Even if the light color of the traffic light is yellow, the output unit does not output the information of the call attention when the own vehicle is located in the range of the travelable distance on the entrance side from the reference position on the exit side of the intersection.

6 Claims, 5 Drawing Sheets

DRIVING SUPPORT DEVICE THAT CONTROLS NOTIFICATION OF THE COLOR OF A TRAFFIC LIGHT BASED ON THE SIZE OF AN INTERSECTION

CROSS-REFERENCE TO RELATED APPLICATION

This application claims priority to Japanese Patent Application No. 2023-183430 filed on Oct. 25, 2023, incorporated herein by reference in its entirety.

BACKGROUND

1. Technical Field

The present disclosure relates to a driving support device of a vehicle.

2. Description of Related Art

A support device that supports stopping of an own vehicle in accordance with a light color of a traffic light is known (for example, refer to Japanese Unexamined Patent Application Publication No. 2023-063940 (JP 2023-063940 A)). The support device specifies a region to perform a call attention when it is recognized that the light color of the traffic light is yellow or red. An end portion of the region to perform a call attention on a side near the traffic light is set closer to the own vehicle side than a stopping reference position such as a stop line. The support device performs a call attention when it is determined that the vehicle is traveling within the region to perform a call attention, and does not perform a call attention when it is determined that the vehicle is not traveling within the region to perform a call attention.

SUMMARY

The present inventors have recognized that there is a situation, when a region to perform a call attention is specified regardless of the size of an intersection, in which a driver may feel annoyed at a call attention, in accordance with the size of the intersection.

An objective of the present disclosure is to provide technology that can more appropriately perform a call attention, in relation to a light color of a traffic light.

In order to solve the problem, a driving support device of a certain aspect of the present disclosure includes an output unit that outputs information of a call attention for a driver of an own vehicle when a light color of a traffic light at an intersection in front of the own vehicle is yellow, and a distance acquisition unit that acquires a travelable distance of the own vehicle within a predetermined reference time.

The output unit does not output the information of the call attention when the own vehicle is positioned within a range of the travelable distance on an entrance side from a reference position on an exit side of the intersection even when the light color of the traffic light is yellow.

According to the present disclosure, technology can be provided that can more appropriately perform a call attention, in relation to a light color of a traffic light.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
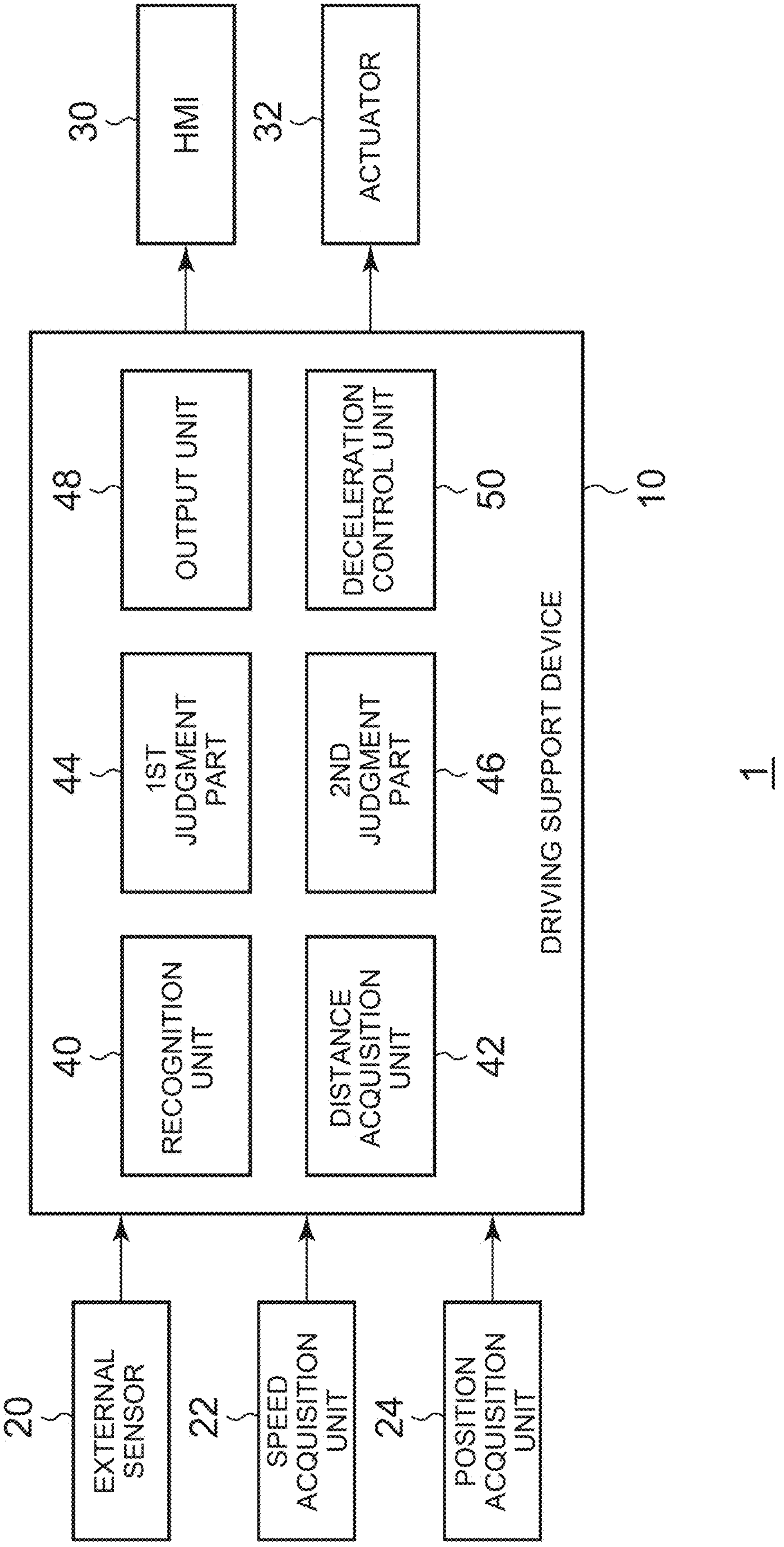
FIG. 1 is a diagram illustrating a functional configuration of an in-vehicle system according to an embodiment.

FIG. 1 shows a functional configuration of an in-vehicle system 1 according to an embodiment. The in-vehicle system 1 is mounted on a vehicle. The in-vehicle system 1 includes a driving support device 10, an external sensor 20, a speed acquisition unit 22, a position acquisition unit 24, a Human Machine Interface (HMI) 30, and an actuator 32.

The external sensor 20 includes a camera that periodically captures an image of the outside of the own vehicle. The external sensor 20 supplies the captured image to the driving support device 10. The external sensor 20 may include, for example, a radar or a Light Detection and Ranging (LiDAR) for recognizing the external environment.

The speed acquisition unit 22 periodically acquires the speed of the own vehicle, and supplies the acquired speed information to the driving support device 10. The position acquisition unit 24 periodically acquires the position of the own vehicle using a Global Navigation Satellite System (GNSS), and supplies the acquired position information to the driving support device 10.

The driving support device 10 recognizes the light color of the traffic light existing in front of the own vehicle in the traveling direction based on the image captured by the external sensor 20. When the recognized light color is yellow or red and the own vehicle is located in the call attention section, the driving support device 10 sends a call attention signal to HMI 30 to call attention the driver of the own vehicle via HMI 30 as the driving assistance.

HMI 30 receives a call attention signal from the driving support device 10, and executes a call attention to the driver. HMI 30 includes, for example, at least one of a Multi Information Display (MID) provided in the instrument cluster and a buzzer. MID displays characters and images for calling attention, and notifies the driver that the light color of the traffic light is yellow or red. The buzzer outputs a sound to inform the driver that the light color of the traffic light is yellow or red.

When the recognized light color is red and the predetermined deceleration condition is satisfied, the driving support device 10 sends a control signal to the actuator 32, and causes the actuator 32 to perform the deceleration operation as the driving assistance. Upon receiving the control signal from the driving support device 10, the actuator 32 operates the brake of the own vehicle.

Various known aspects can be applied to the external sensor 20, the speed acquisition unit 22, the position acquisition unit 24, HMI 30, and the actuator 32, and thus further explanation thereof will be omitted.

Figure 2A:
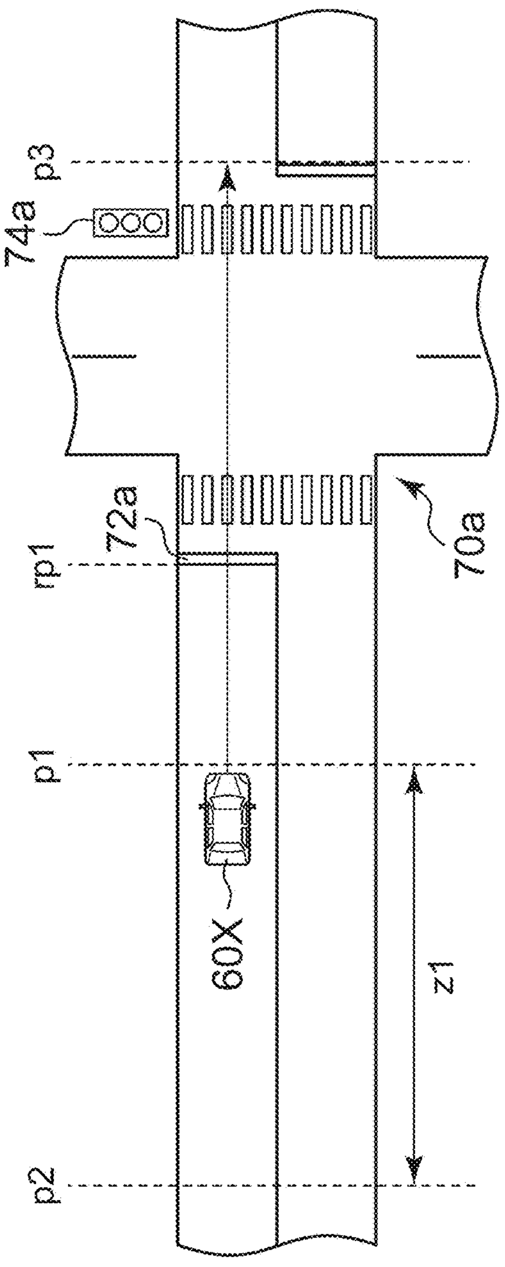
FIG. 2A is a diagram for explaining a call attention of a comparative embodiment.
Figure 2B:
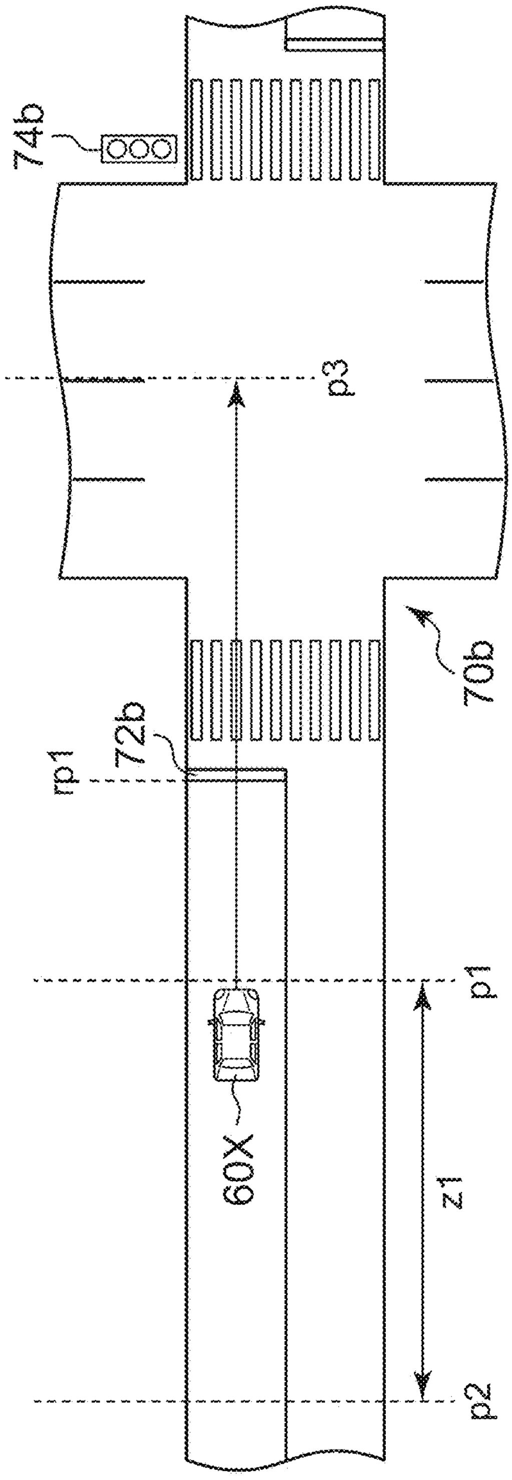
FIG. 2B is a diagram for explaining a call attention of a comparative embodiment.

Here, the call attention operation of the comparative example will be described. FIG. 2A and FIG. 2B are diagrams for explaining the call attention operation of the comparative example. FIG. 2A shows a situation in which the vehicle 60X enters an intersection 70*a* where the intersecting street is relatively narrow. The distance from the entrance to the exit of the intersection 70*a* in the traveling direction of the vehicle 60X is relatively short, and the distance from the exit of the intersection 70*a* from the stop line 72*a* near the entrance of the intersection 70*a* is also relatively short.

FIG. 2B shows a situation in which vehicle 60X enters a relatively wide intersection 70*b*. As compared with the intersection 70*a*, the distance from the entrance to the exit of the intersection 70*b* in the traveling direction of the vehicle 60X is relatively long, and the distance from the stop line 72*b* near the entrance of the intersection 70*b* to the exit of the intersection 70*b* is also relatively long.

The position of the stop line 72*a* of the narrow intersection 70*a* and the position of the stop line 72*b* of the wide intersection 70*b* are respectively set as the stopping reference position rp1.

FIGS. 2A and 2B show the conditions when the light color of the traffic light 74*a*, 74*b* to be followed by the vehicle 60X changes from blue to yellow. Hereinafter, as appropriate, the intersection 70*a* and the intersection 70*b* are collectively referred to as the intersection 70, the stop line 72*a* and the stop line 72*b* are collectively referred to as the stop line 72, and the traffic light 74*a* and the traffic light 74*b* are collectively referred to as the traffic light 74.

In FIG. 2A and FIG. 2B, it is assumed that the distance from the current position of the vehicle 60X to the stopping reference position rp1 is the same, and the current speed of the vehicle 60X when the light color of the traffic light 74 changes from blue to yellow is also the same.

When the light color of the traffic light 74 changes to yellow, the first position p1 is determined based on, for example, the present speed of the vehicle 60X, the maximal value of the predetermined deceleration, and the stopping reference position rp1. A section between the first position p1 and the stopping reference position rp1 is a section where no call attention. Between the first position p1 and the stopping reference position rp1 may also be referred to as a dilemma zone. In contrast to the illustrated scenario, assuming that the driver has recognized a yellow signal between the first position p1 and the stopping reference position rp1, the driver may press the brake pedal relatively strongly so that the vehicle 60X stops near the stop line 72. On the other hand, the driver may determine that it is difficult to safely stop the vehicle 60X on the stop line 72, and may perform driving so that the vehicle 60X passes through the intersection 70. Therefore, even when a yellow signal is detected, when the vehicle 60X is positioned between the first position p1 and the stopping reference position rp1, there is a possibility that the driver remembers troublesomeness, so that the call attention is not executed.

When the light color of the traffic light 74 changes to yellow, the second position p2 is determined based on, for example, the present speed of the vehicle 60X, the smallest value of the predetermined deceleration, and the stopping reference position rp1. Between the first position p1 and the second position p2 is a call attention section z1. When a yellow signal is detected, if the vehicle 60X is located between the first position p1 and the second position p2, the driver executes call attention. Even if a yellow signal is detected, if the vehicle 60X does not reach the second position p2, the driver is not executing call attention. In FIGS. 2A and 2B, the positional relations between the stopping reference position rp1, the first position p1, and the second position p2 are the same.

Here, as shown in FIGS. 2A and 2B, when the light color of the traffic light 74 changes from blue to yellow when the vehicle 60X is positioned immediately before the call attention section between the first position p1 and the stopping reference position rp1, that is, immediately before the first position p1, it is determined whether the driver stops or passes. It is assumed that the size of the intersection 70 is taken into consideration as one of the materials to be determined. In this case, as the situation of the driver when the traffic light 74 is switched to yellow, the following two types can be considered depending on the size of the intersection 70. Hereinafter, the duration time of the yellow signal is assumed to be 3 seconds.

In the wide intersection 70*b* of the illustrated FIG. 2B, the driver feels dangerous and is likely to shut down the vehicle 60X because the vehicle 60X is likely to be located within the intersection 70*b* after 3 seconds. The vehicle 60X reaches the position p3 in the intersection 70*b* after 3 seconds if it continues to travel at the present velocity. In this situation, even if the vehicle 60X is accelerated and passes through the intersection 70*b*, it is highly likely that the driver is dangerous, and therefore, it is difficult for the driver to feel troublesomeness in response to a call attention immediately before the first position p1.

In the narrow intersection 70*a* in FIG. 2A, there is a possibility that the driver can pass through the intersection 70*a* in 3 seconds and then run through. The position p3 of the vehicle 60X after 3 seconds when the vehicle continues to travel at the present speed is a position that has exited the intersection 70*a*. In this case, the driver may feel troublesome with respect to the call attention immediately before the first position p1.

Therefore, in the driving support device 10 of the embodiment, when the intersection 70*a* is relatively narrow as in FIG. 2A, as compared with a case where the intersection 70*b* is relatively wide as in FIG. 2B, the section of no call attention between the first position p1 and the stopping reference position rp1 is widened away from the intersection 70*a*. Thus, in a situation where the light color of the traffic light 74*a* is changed to yellow in front of the relatively narrow intersection 70*a* and the own vehicle can pass through the intersection 70*a* during the yellow color, it is possible to prevent the call attention from being executed, and thus it is possible to make it difficult for the driver to feel annoyed. Hereinafter, the driving support device 10 according to the embodiment will be described in detail with reference to FIG. 1, FIG. 3A, and FIG. 3B.

Figure 3A:
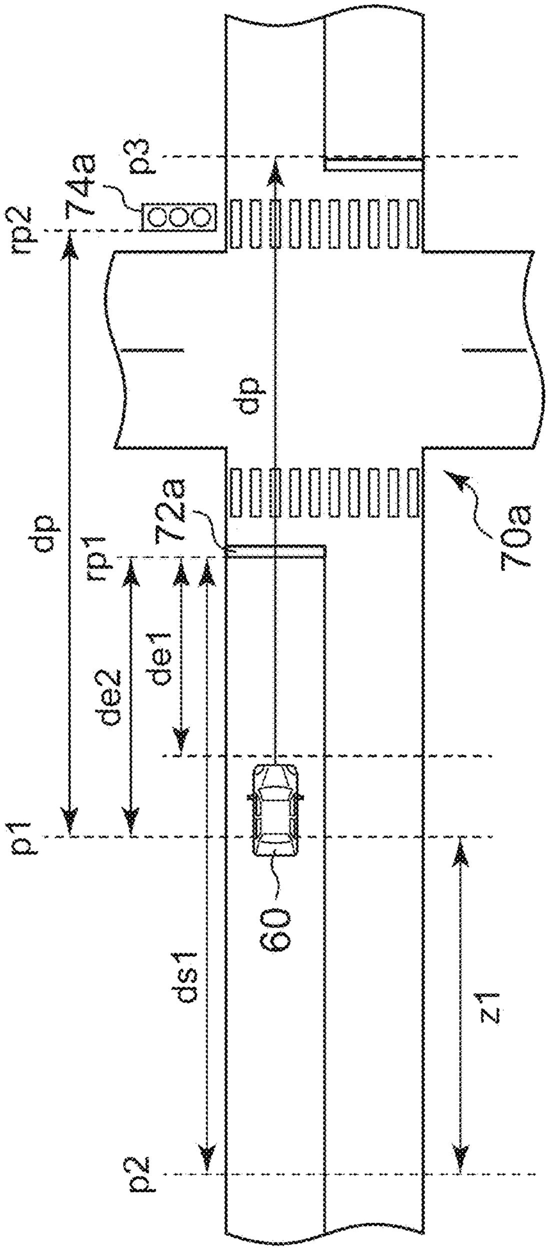
FIG. 3A is a diagram for describing a call attention according to an embodiment.
Figure 3B:
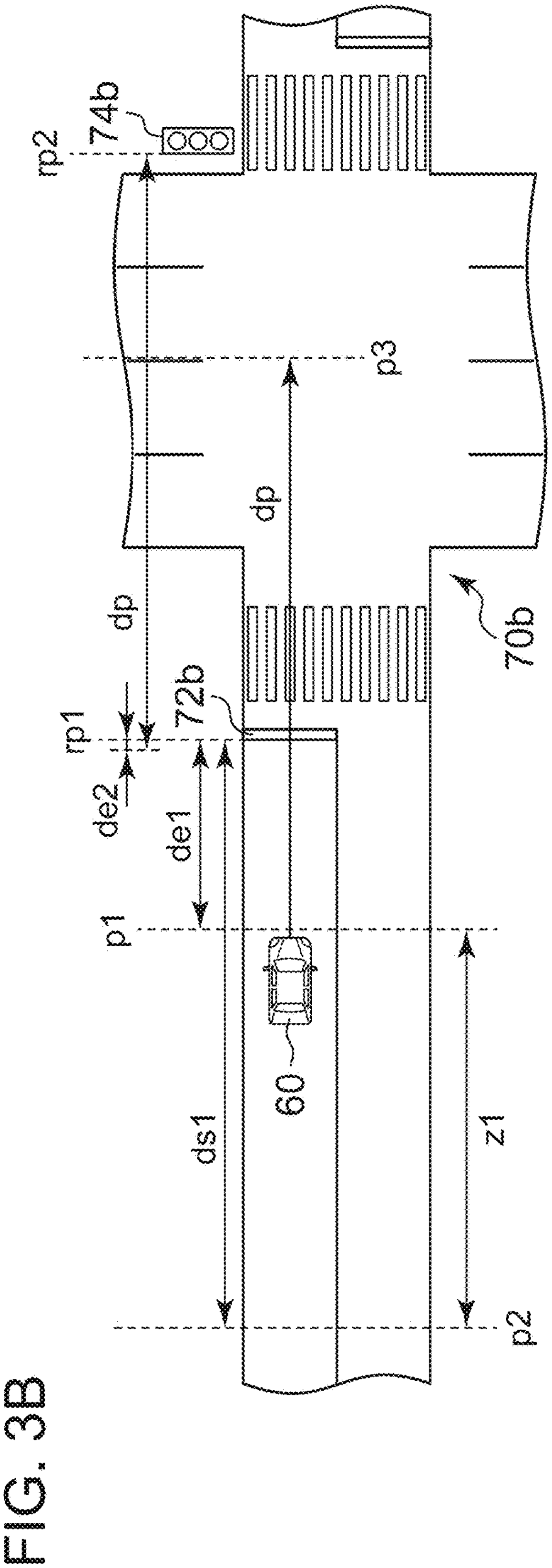
FIG. 3B is a diagram for describing a call attention according to an embodiment.

FIG. 3A and FIG. 3B are diagrams for describing a call attention operation according to the embodiment. FIG. 3A shows a situation in which the own vehicle 60 enters a relatively narrow intersection 70*a*. FIG. 3A shows the same intersection 70*a* as FIG. 2A. FIG. 3B shows a situation in which the own vehicle 60 enters a relatively wide intersection 70*b*. FIG. 3B shows the same intersection 70*b* as in FIG. 2B. FIG. 3A and FIG. 3B show the situation when the light color of the traffic light 74*a*, 74*b* to be followed by the own vehicle 60 changes from blue to yellow. The in-vehicle system 1 is mounted on the own vehicle 60.

As illustrated in FIG. 1, the driving support device 10 includes a recognition unit 40, a distance acquisition unit 42, a first determination unit 44, a second determination unit 46, an output unit 48, and a deceleration control unit 50. The configuration of the driving support device 10 may be realized by hardware, a CPU of any computer, a memory, or another LSI, and may be realized by software, a program loaded into the memory, or the like. Here, functional blocks realized by the cooperation are depicted. Accordingly, those skilled in the art will appreciate that these functional blocks can be implemented in various forms by hardware only, software only, or a combination thereof.

The recognition unit 40 recognizes the traffic light 74, the light color of the traffic light 74, and the stop line 72 on the entrance side of the intersection 70 at the intersection 70 in front of the own vehicle 60, based on an image or the like supplied from the external sensor 20. The recognition unit 40 acquires the distance from the own vehicle 60 to the traffic light 74 and the distance from the own vehicle 60 to the stop line 72. Since various known techniques can be applied as the recognition processing by the recognition unit 40, detailed description thereof will be omitted.

When the recognition unit 40 detects that the light color of the traffic light 74 is yellow or red, the distance acquisition unit 42 acquires the speed of the own vehicle 60 at that time from the speed acquisition unit 22. The distance acquisition unit 42 derives a travelable distance dp of the own vehicle 60 within a predetermined reference time at the acquired speed. The reference time is predetermined to be greater than or equal to the yellow duration time of the traffic light 74. For example, the reference time may be equal to the duration time of yellow. In the case where the effect of reducing the troublesomeness of the call attention is enhanced, the reference time may be longer than the duration time of the yellow color, but is set to be equal to or less than a predetermined upper limit value. The relationship between the reference time and the duration time of the yellow color and the upper limit of the reference time can be appropriately determined by an experiment.

Note that the distance acquisition unit 42 may refer to the database holding the yellow duration time of the traffic light 74 for each region, and acquire the yellow duration time based on the current position of the own vehicle 60 acquired by the position acquisition unit 24. The distance acquisition unit 42 may set the reference time based on the acquired duration time. In this case, the reference time may be different depending on the area in which the own vehicle 60 is traveling. This makes it possible to more accurately acquire the travelable distance dp of the own vehicle 60 within the reference time in situations where the yellow duration time differs for each region.

When the light color of the traffic light 74 is detected to be yellow or red by the recognition unit 40, the distance acquisition unit 42 further derives the maximum value ds1 and the minimum value de1 of the distance required for stopping the own vehicle 60 on the basis of the acquired speed of the own vehicle 60 and the predetermined reference deceleration range. The maximum ds1 of the distance required for stopping is also referred to as the maximum distance. The minimum de1 of the distance required for stopping is also referred to as the first minimum distance. The reference deceleration range is a general deceleration range during vehicle braking. Numerical examples will be described in detail. It is assumed that the speed of the own vehicle 60 is 40 kilometers per hour, the deceleration range is 3 $m/s^2$ to 8 $m/s^2$ seconds, and the driver's response speed is 1.5 seconds. Here, the minimum value de1 of the distance required for stopping the own vehicle 60 is about 24 meters, and the maximum value ds1 is about 37 meters. The maximum value ds1 and the minimum value de1 of the distance required for stopping may be derived using other known methods.

The first determination unit 44 sets the stopping reference position rp1 on the entrance side of the intersection 70 to, for example, the position of the stop line 72 on the entrance side. The first determination unit 44 sets the reference position rp2 at the exit side of the intersection 70 to, for example, the position of the traffic light 74. The exit side reference position rp2 may be set at a position such as a stop line of the opposite lane. The first determination unit 44 can specify the position of the stop line 72 and the position of the traffic light 74 based on the distance from the own vehicle 60 to the stop line 72 acquired by the recognition unit 40 and the distance from the own vehicle 60 to the traffic light 74. The first determination unit 44 may specify the position of the stop line 72, the position of the traffic light 74, and the like from the map information.

When the light color of the traffic light 74 is detected to be yellow or red by the recognition unit 40, the first determination unit 44 identifies the call attention section z1 on the basis of the maximum value ds1 and the minimum value de1 of the distance required for the derived stop, the stopping reference position rp1, the travelable distance dp that can be traveled within the derived reference time, and the exit side reference position rp2.

The first determination unit 44 sets a position farther from the intersection 70 among the position of the own vehicle 60 side by the minimum de1 of the distance required for stopping from the stopping reference position rp1 and the position of the own vehicle 60 side by the travelable distance dp from the exit side reference position rp2 as the first position p1. The first determination unit 44 sets the position of the own vehicle 60 as the second position p2 by the maximum-value ds1 of the distance required for stopping from the stopping reference position rp1. The first determination unit 44 specifies the call attention section z1 between the first position p1 and the second position p2.

Note that the distance acquisition unit 42 may derive the second smallest distance de2, which is the distance between the position on the own vehicle 60 side and the stopping reference position rp1, by the travelable distance dp from the exit side reference position rp2. When the position on the own vehicle 60 side is located closer to the intersection 70 side than the stopping reference position rp1 by the travelable distance dp from the reference position rp2 on the exit side, the second smallest distance de2 may be zeroed. Then, the first determination unit 44 may set the call attention section z1 in a range from the longer one of the minimum value de1 of the distance necessary for stopping and the second minimum distance de2 to the maximum value ds1 of the distance necessary for stopping with reference to the stopping reference position rp1.

As shown in FIGS. 3A and 3B, in the narrow intersection 70*a*, the exit side reference position rp2 is closer to the own vehicle 60 as compared with the wide intersection 70*b*. Therefore, in the narrow intersection 70*a*, the first position p1 becomes the position on the own vehicle 60 side by the travelable distance dp from the reference position rp2 on the exit side. On the other hand, in the wide intersection 70*b*, the first position p1 is a position closer to the own vehicle 60 by the smallest de1 of the distance required for stopping from the stopping reference position rp1. Therefore, in the narrow intersection 70*a*, as compared with the wide intersection 70*b*, the first position p1 is separated from the stopping reference position rp1, thereby narrowing in the direction away from the intersection 70*a* the call attention section z1, the section that is not attention-calling is spread in the direction away from the intersection 70*a*. Therefore, in the intersection 70*a* where the situation in FIG. 3A is narrow, the own vehicle 60 is located in a section where no call attention. In the intersection 70*b* where the situation in FIG. 3B is wide, the own vehicle 60 is located in the call attention section z1.

The first determination unit 44 determines whether or not the own vehicle 60 is located within the call attention section z1 based on the present position of the own vehicle 60 acquired by the position acquisition unit 24, and supplies the determination result to the output unit 48. When it is determined that the own vehicle 60 is located within the call attention section z1, the output unit 48 outputs the attention calling information via HMI 30. On the other hand, when it is determined that the own vehicle 60 is not located within the call attention section z1, the output unit 48 does not output the attention calling information via HMI 30.

That is, when the light color of the traffic light 74 is yellow, when the own vehicle 60 is positioned between the first position p1 and the second position p2, the output unit 48 outputs the call attention for the driver of the own vehicle 60. Even if the light color of the traffic light 74 is yellow, the output unit 48 does not output the call attention when the own vehicle 60 is not positioned between the first position p1 and the second position p2. Even if the light color of the traffic light 74 is yellow, it can be said that the output unit 48 does not output the call attention information when the own vehicle 60 is located in the range of the travelable distance dp on the entrance side from the reference position rp2 on the exit side of the intersection 70.

Thus, as shown in FIG. 3A, in a situation where the own vehicle 60 can pass through the intersection 70*a* while the light color of the traffic light 74*a* is yellow in front of the narrow intersection 70*a*, it is possible to prevent the call attention information from being outputted. This makes it difficult for the driver to feel troublesome.

On the other hand, as shown in FIG. 3B, in a situation where it is not easy for the own vehicle 60 to pass through the intersection 70*b* while the light color of the traffic light 74*b* is yellow in front of the wide intersection 70*b*, the call attention can be outputted. Therefore, the driver can be appropriately supported.

Figure 4:
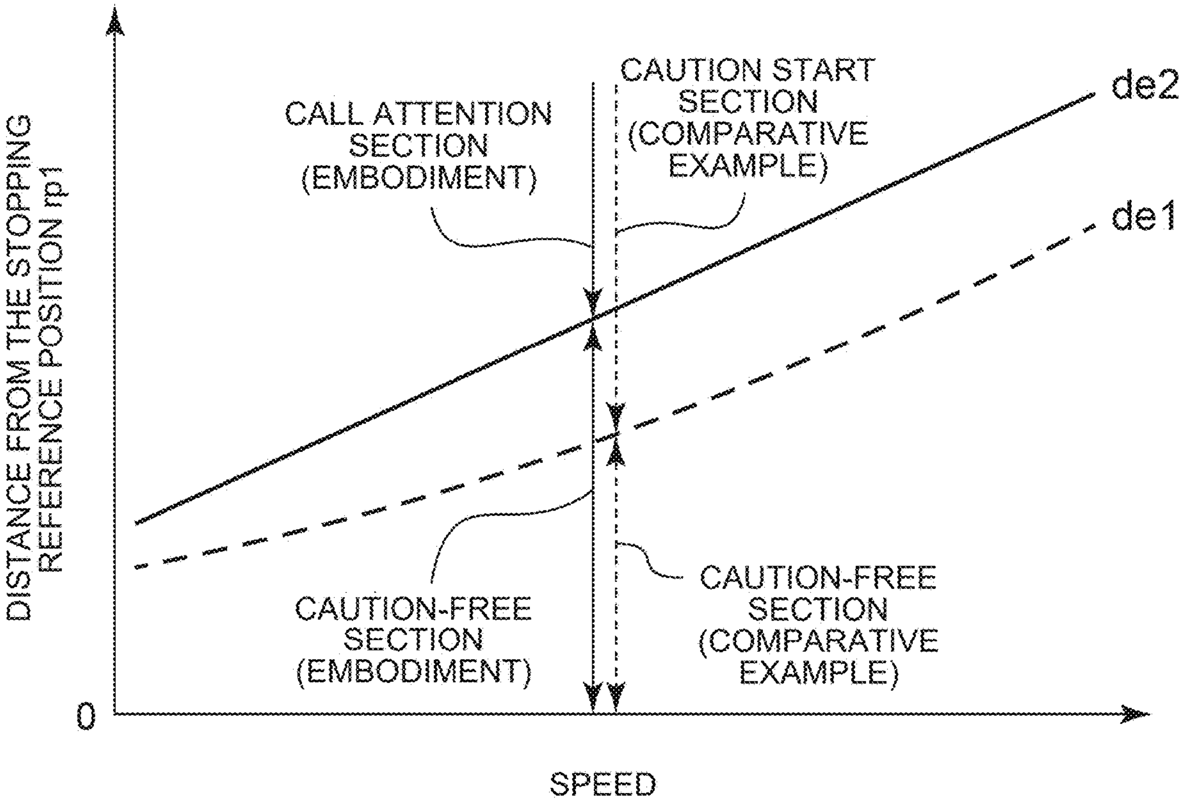
FIG. 4 is a diagram showing the relation between the first minimum distance de1 and the second minimum distance de2 with respect to the velocity of the own vehicle at the narrow intersection of FIG. 3A.

FIG. 4 shows the relation between the first minimum distance de1 and the second minimum distance de2 with respect to the velocity of the own vehicle 60 in the narrow intersection 70*a* of FIG. 3A. In the narrow intersection 70*a*, in the velocity range shown in FIG. 4, the second minimum distance de2 is greater than the first minimum distance de1. That is, the position corresponding to the second smallest distance de2 is the first position p1 of the call attention section z1. Therefore, the call attention section z1 is wider than that of the comparative example. In the narrow intersection 70*a*, as illustrated in FIG. 4, for example, the call attention section z1 approaches the stopping reference position rp1 as the speed of the own vehicle 60 decreases, and moves away from the stopping reference position rp1 as the speed of the own vehicle 60 increases.

The driving support device 10 may have a map that defines the relation between the velocity of the own vehicle 60 and the first smallest distance de1, for example, as illustrated in FIG. 4. Although not shown, the map may also define the relationship between the speed and the maximum distance ds1 and the relationship between the speed and the travelable distance dp within the reference time. This map does not depend on the size of the intersection 70. The distance acquisition unit 42 may specify the maximum distance ds1, the first minimum distance de1, and the travelable distance dp from the map and the speed of the own vehicle 60 instead of deriving the maximum value ds1 and the minimum value de1 of the distance required for stopping, that is, the maximum distance ds1 and the first minimum distance de1, and the distance dp that can be traveled within the reference time.

When the recognition unit 40 detects that the light color of the traffic light 74 is red, the second determination unit 46 determines whether or not a predetermined deceleration condition is satisfied, and supplies the determination result to the deceleration control unit 50. Known conditions can be used as the deceleration conditions. The deceleration condition may be, for example, that the light color of the traffic light 74 is red continuously detected for a predetermined time or longer, and that the speed of the own vehicle 60 is equal to or higher than a threshold value. When it is determined that the deceleration condition is satisfied, the deceleration control unit 50 causes the actuator 32 to execute the deceleration operation. When it is determined that the deceleration condition is not satisfied, the deceleration control unit 50 does not cause the actuator 32 to perform the deceleration operation. The second determination unit 46 and the deceleration control unit 50 are arbitrary.

Figure 5:
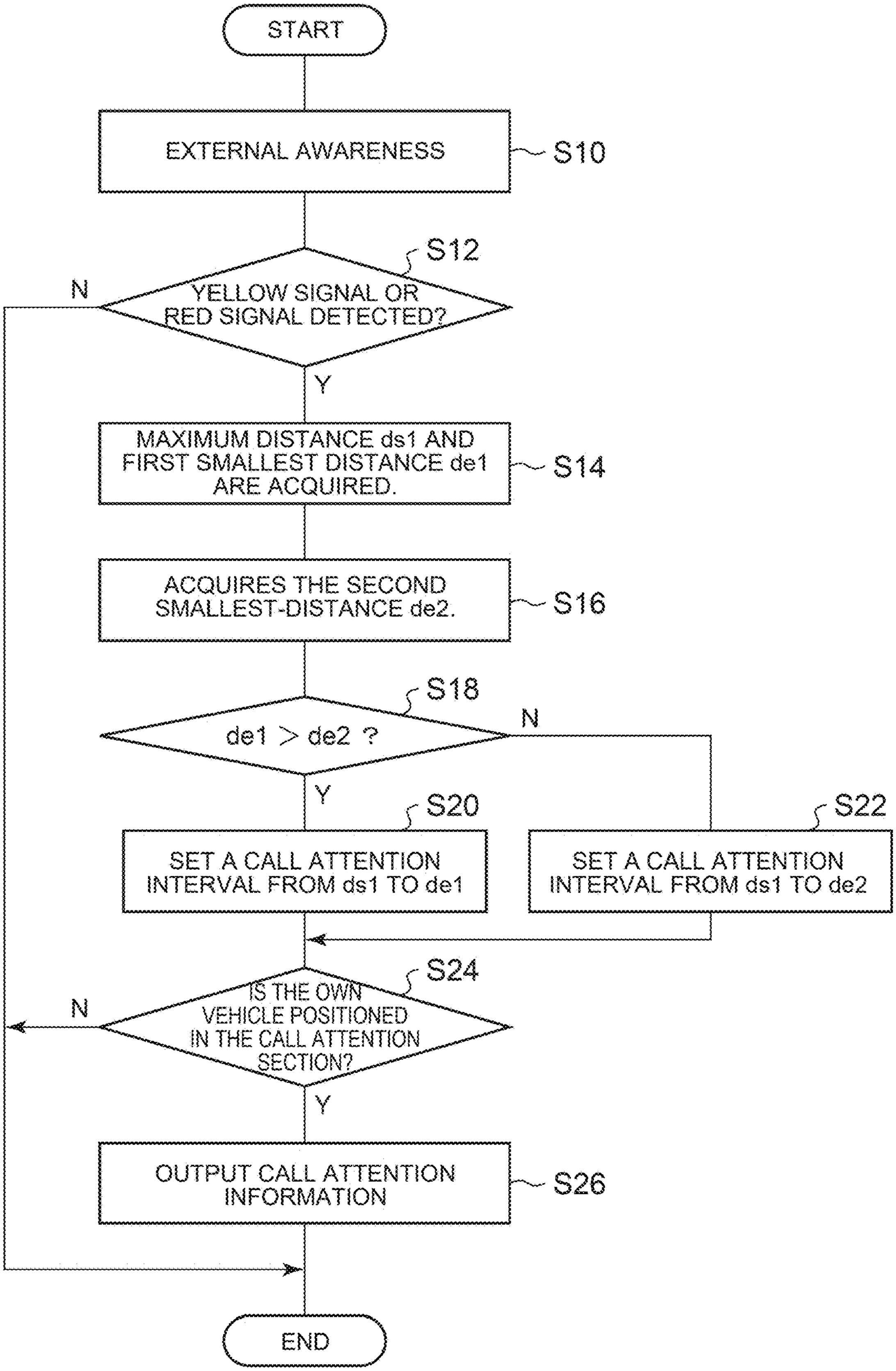
FIG. 5 is a flowchart illustrating a process of the driving support device of FIG. 1.

Next, an overall operation of the driving support device 10 having the above-described configuration will be described. FIG. 5 is a flowchart showing a process of the driving support device 10 of FIG. 1. The process of FIG. 5 is repeated periodically at predetermined intervals.

The recognition unit 40 recognizes the external environment based on images of cameras included in the external sensor 20, and detects the light color of the traffic light or the like (S10). When it is not detected that the light color of the traffic light is yellow or red (N in S12), the driving support device 10 ends the process. When it is detected that the light color of the traffic light is yellow or red (Y in S12), the distance acquisition unit 42 acquires the maximum distance ds1 and the first minimum distance de1 (S14), and acquires the second minimum distance de2 (S16). The order of S14 and S16 may be reversed. As described above, the maximum value ds1 of the distance required for stopping the own vehicle 60 is the maximum distance, and the minimum value de1 of the distance required for stopping is the first minimum distance.

When the first minimum distance de1 is larger than the second minimum distance de2 (Y in S18), the first determination unit 44 sets the call attention section z1 in the range of the first minimum distance de1 from the maximum distance ds1 (S20). When the first minimum distance de1 is equal to or smaller than the second minimum distance de2 (N in S18), the first determination unit 44 sets the call attention section z1 in the range of the second minimum distance de2 from the maximum distance ds1 (S22).

When the own vehicle 60 is not located in the call attention section z1 (N in S24), the driving support device 10 ends the process. When the own vehicle 60 is located in the call attention section z1 (Y in S24), the output unit 48 outputs the attention-calling information via HMI 30 (S26), and the driving support device 10 ends the process.

According to the embodiment, even if the light color of the traffic light 74 is yellow, when the own vehicle 60 is located within the range of the travelable distance dp of the own vehicle 60 at the present speed within the reference time from the reference position rp2 on the exit side of the intersection 70, the call attention is not executed. That is, in a case where the intersection 70 is relatively small, as compared with a case where the intersection is large, a region where no call attention spreads in a direction away from the intersection 70. Therefore, it is possible to appropriately set a region that does not call attention in accordance with the size of the intersection 70. Therefore, it is possible to make it difficult for the driver to feel the call attention troublesomely. Since the reference time is greater than or equal to the yellow duration time of the traffic light 74, it may be avoided to call attention at a location where the light color of the traffic light 74 may pass generally through the intersection 70 during the yellow color.

Further, among the position on the side of the own vehicle 60 by the minimum de1 of the distance required for stopping from the stopping reference position rp1 and the position on the side of the own vehicle 60 by the travelable distance dp from the reference position rp2 on the exit side, the position farther from the intersection 70 is set as the first position p1. Therefore, it is possible to appropriately set the call attention section z1 and the section not call attention according to the size of the intersection 70. Even when it is detected that the light color of the traffic light 74 is yellow, if the own vehicle 60 is traveling at a position relatively close to the entrance of the intersection 70 and there is a possibility that it is difficult to safely stop the own vehicle 60, a call attention can be prevented from being executed. Therefore, it is possible to make it difficult for the driver in such a situation to feel troublesome.

Further, the position of the own vehicle 60 is set as the second position p2 by the maximum-value ds1 of the distance required for stopping from the stopping reference position rp1. Therefore, even when it is detected that the light color of the traffic light 74 is yellow or red, if the own vehicle 60 is traveling at a position relatively far from the intersection 70 and there is a possibility that the driver does not immediately perform the deceleration operation, it is possible to prevent the call attention from being executed. Therefore, it is possible to make it difficult for the driver who is scheduled to perform the deceleration operation after approaching the intersection 70 to feel troublesome.

From the above, it is possible to more appropriately call attention the driver of the light color of the traffic light 74 in front of the own vehicle 60.

The present disclosure has been described above based on the embodiments. It will be understood by those skilled in the art that the embodiments are merely illustrative, and that various modifications can be made to the respective components and combinations of the respective processing processes, and that such modifications are within the scope of the present disclosure.

What is claimed is:

1. A driving support device comprising:
- a computing device including a processor and a memory storing program instructions that, when executed by the processor, cause the processor to perform operations including:
- outputting information of a call attention for a driver of a vehicle when a light color of a traffic light at an intersection in front of the vehicle is yellow; and
- acquiring a distance to be traveled by the vehicle within a predetermined reference time, wherein:
- the processor does not output the information of the call attention when the vehicle is positioned within a road section that encompasses the distance to be traveled by the vehicle within the predetermined reference time from a reference position on an exit side of the intersection toward an entrance side of the intersection even when the light color of the traffic light is yellow.

2. The driving support device according to claim 1, wherein the predetermined reference time is determined to be at least a duration of time when the traffic light is yellow.

3. The driving support device according to claim 1, wherein the processor acquires the distance to be traveled by the vehicle within the predetermined reference time at a speed of the vehicle when a yellow light color of the traffic light is detected.

4. The driving support device according to claim 1, wherein:
- the processor further acquires a distance necessary for stopping of the vehicle based on a speed of the vehicle;
- the processor sets as a first position a position that is the farthest position from the intersection of a position of the vehicle at a distance necessary for stopping from a stopping reference position on the entrance side of the intersection or a position of the vehicle at the distance to be traveled by the vehicle within the predetermined reference time from the reference position on the exit side toward the entrance side of the intersection; and
- the processor
  - outputs the information of the call attention when the light color of the traffic light is yellow and the vehicle has not reached the first position, and
  - does not output the information of the call attention when the vehicle is positioned closer to a side of the intersection than the first position even when the light color of the traffic light is yellow.

5. The driving support device according to claim 1, wherein:
- the processor further acquires a maximum distance and a minimum distance necessary for stopping of the vehicle based on a speed of the vehicle;
- the processor sets as a first position a position that is the farthest position from the intersection of a position of the vehicle at a minimum distance from a stopping reference position on the entrance side of the intersection or a position of the vehicle at the distance to be traveled by the vehicle during the predetermined reference time from the reference position on the exit side toward the entrance side of the intersection;
- the processor sets as a second position a position of the vehicle at a maximum distance from the stopping reference position on the entrance side of the intersection; and
- the processor
  - outputs the information of the call attention when the light color of the traffic light is yellow and the vehicle is positioned between the first position and the second position, and
  - does not output the information of the call attention when the vehicle is not positioned between the first position and the second position even when the light color of the traffic light is yellow.

6. The driving support device according to claim 1, wherein the light color of the traffic light at the intersection is detected by a camera in the own vehicle.

* * * * *